(No Model.)
S. N. BRYAN.
CULINARY UTENSIL.
No. 416,711. Patented Dec. 10, 1889.
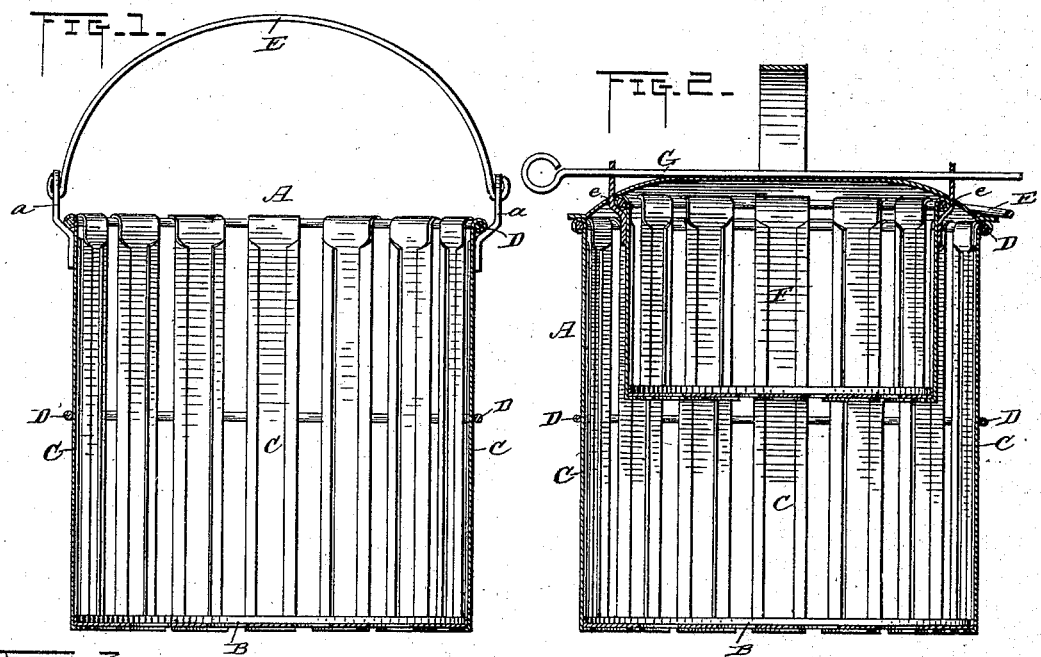
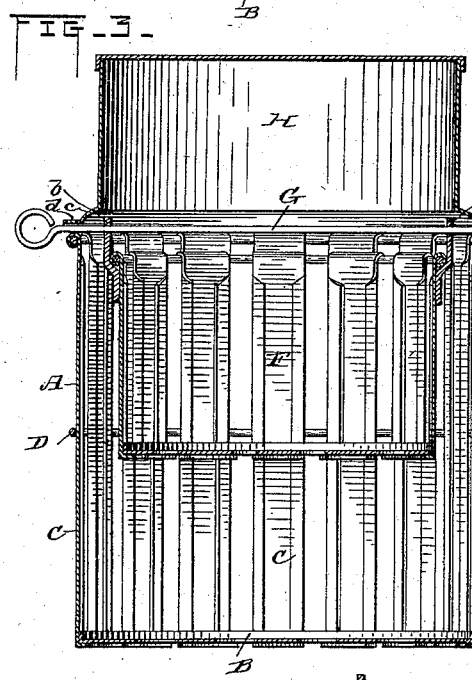
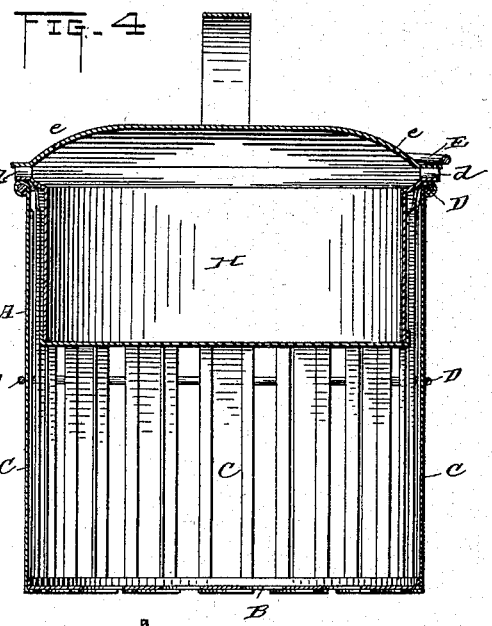
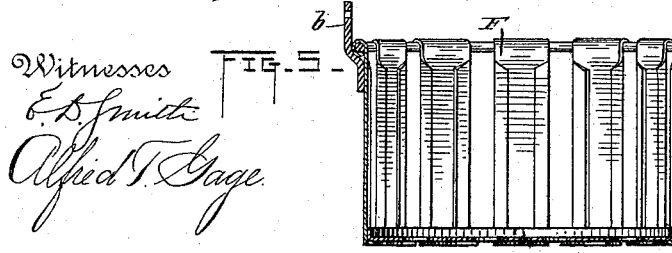
Witnesses
E. D. Smith
Alfred T. Gage
Inventor
Sarah N. Bryan
by J. R. Henderson
her Attorney

UNITED STATES PATENT OFFICE.

SARAH N. BRYAN, OF FARMER, OHIO.

CULINARY UTENSIL.

SPECIFICATION forming part of Letters Patent No. 416,711, dated December 10, 1889.

Application filed December 31, 1888. Serial No. 295,060. (No model.)

*To all whom it may concern:*

Be it known that I, SARAH N. BRYAN, a citizen of the United States, residing at Farmer, in the county of Defiance and State of Ohio, have invented certain new and useful Improvements in Culinary Utensils; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to domestic boilers, and has for its object to construct and combine several parts so that they can be used either together or separately for the purpose of boiling and steaming, or either, vegetables and other articles, and to facilitate the easy and quick removal of the same from the vessel in which the boiling water is contained; and with the view of accomplishing the above, and such other objects as may hereinafter appear, the invention consists in the construction and combination of parts hereinafter particularly described and claimed, reference being had to the accompanying drawings, forming a part hereof.

Figure 1 is a vertical section of the outside basket. Fig. 2 is a similar view with the inside crate in position and cover on basket. Fig. 3 is a similar view with dome-shaped cover on basket; Fig. 4, a vertical section with dome-shaped cover inverted, and Fig. 5 a vertical section through the inside crate.

In the drawings, the letter A designates a grated basket suitably constructed to permit the water to flow in and out of the same, but preferably composed of a perforated plate-bottom B and upright bars or strips C, connected together and braced by transverse wires D, said bars and wires constituting the open sides of the basket. This basket may also be provided with ears $a$ and a bail E for handling the same. This basket is to be placed in a pot containing boiling water, and the articles to be cooked are placed within the basket, so that the water may come in contact with the same to cook them, and so that the articles can be removed from the pot without separate handling. This basket is provided with a crate F, adapted to fit within the basket and be suspended therein by means of a rod G, passed transversely through ears $b$ and resting upon the top edge of basket A. This crate is designed to hold articles which are to be cooked by steaming instead of by boiling, the steam rising from the boiling water being utilized for the purpose, so that it will be observed that both boiling and steaming are carried on at the same time. The construction of the crate and means for suspending it permit it to be used separately, if so desired, and also permit it to be removed without disturbing the contents of the basket. The crate being suspended so as to swing or vibrate in the basket, its contents are free to move back and forth with the crate, and thus receive the benefit of a constant change of position.

In order to prevent the too free escape of steam from the crate, and at the same time to provide for confining it above the top of the contents of the crate when the contents extend up above the top of the crate, I provide a dome-shaped cover H, having a laterally-extending flange $c$, to rest on the top edge of the basket A, which flange will be formed with recesses or openings $d$, to fit around the rod G, so that the rod will thus prevent the cover from slipping and aid in holding the same in place. The dome portion of the cover will allow the steam to circulate over and about the top of the contents of the crate, so that all portions may be thoroughly steamed. It is obvious that this top can be used for heating or cooking articles by the heat from the water circulating in the basket when the crate is removed. For that purpose it is only necessary to turn the dome-shaped cover upside down, so as to bring the depressed portion within the basket, the cover being suspended thereby, its flange resting on the top edge of the basket.

Instead of using the dome-shaped cover, I may use the cover shown in Fig. 2, in which the cover is formed with openings or slots $e$ for the passage of the ears $b$ of the crate, the rod G being then passed through the holes in the ears $b$, and thus holding on the cover and at the same time suspending the crate within the basket.

If desired, the cover shown in Fig. 4 may be used as a cover to the dome-shaped cover when the latter is used as a cooking-vessel.

The utensil formed as described is cheap to construct and very efficient in cooking by boiling or steaming, as described, and while all the parts are constructed with the view of being used together it is apparent that if desired they may be used separately for some purposes.

Having described my invention and set forth its merits, what I claim is—

1. The combination, with the grated basket, of the grated crate formed with ears projecting above the top edge of the crate and provided with the rod passed transversely through the ears and resting on the top of the basket for suspending the crate within the basket, substantially as and for the purposes set forth.

2. The combination, with the crate and its cover, of a detachable rod passed through a part of the crate and bearing against the cover and serving to suspend the crate and hold the cover in place, substantially as and for the purposes set forth.

3. The combination, with the crate and basket, of the rod for suspending the crate within the basket, and a dome-shaped cover for the crate, formed with a flange having a recess in it to receive said rod, substantially as and for the purposes set forth.

In testimony whereof I affix my signature in presence of two witnesses.

SARAH N. BRYAN.

Witnesses:
R. L. STARR,
ALICE B. WILDER.